United States Patent Office 3,585,227
Patented June 15, 1971

3,585,227
TRIALKYL OXONIUM SALTS OF THE $HPF_6$, $HAsF_6$ AND $HSbF_6$ ACIDS
Max Peter Dreyfuss, Akron, Ohio, assignor to The B. F. Goodrich Company, New York, N.Y.
No Drawing. Filed June 18, 1969, Ser. No. 834,507
Int. Cl. C07f 9/90, 9/66, 9/102
U.S. Cl. 260—440
6 Claims

ABSTRACT OF THE DISCLOSURE

There is disclosed a method of obtaining the trialkyl oxonium salts of the $HPF_6$, $HAsF_6$ and $HSbF_6$ acids wherein a solution of the acid which may contain water is mixed with an alkylene oxide and a dialkyl ether at low temperatures. Such method results in a precipitate of the desired trialkyl oxonium salt which, surprisingly, is stable in the resulting water-containing medium. Trialkyl oxonium hexafluorophosphates are obtained with $HPF_6$ solutions containing up to 40%/wt. of water. The product may be purified by multiple recrystallization from solvent solution. The resulting salts are useful as ingredients in highly active catalysts for the polymerization of cyclic ethers such as tetrahydrofuran and also as strong alkylating agents in many chemical syntheses.

BACKGROUND OF THE INVENTION

Cyclic ethers such as tetrahydrofuran, the oxetanes and dioxolanes are known to polymerize by what is supposed to be a cationic mechanism in the presence of promoted Friedel-Crafts or Lewis acid type catalysts. The higher molecular weight polymers produced by these catalysts are rubbery, have a substantially linear structure and can be valcanized with sulfur/peroxide type curing systems to form strong, elastic vulcanizates of valuable properties.

The better cationic (oxonium salt) catalysts for the polymerization of cyclic ethers are prepared from expensive, difficult to obtain ingredients. As a result, the polymerized cyclic ethers have not achieved any significant commercial use.

One of the better types of cationic catalysts for the polymerization of the cyclic ether types of monomers is the combination of (1) a trialkyl oxonium salt of $HPF_6$, $HAsF_6$ or $HSbF_6$ and (2) an orthoester such as trimethyl orthoformate, the proportion of the latter ingredient being a convenient mode of controlling the molecular weight of the polymer formed. The trialkyl oxonium salts are expensive to acquire or produce since they have been synthesized in poor yields by cumbersome techniques in anhydrous media employing expensive anhydrous forms of Lewis acid such as $PF_5$, $SbF_5$, $BF_3$, etc.

Such catalysts polymerize cyclic ethers such as tetrahydrofuran ("THF") to nearly any desired molecular weight producing rubbery polymers evidencing a very high degree of crystallinity. A polymerized tetrahydrofuran ("PTHF") of this type when vulcanized with a peroxide/sulfur curing system forms, strong, rubbery vulcanizates having the following physical properties:

Ultimate tensile strength: 4000–5500 p.s.i.
Ultimate elongation: 550–750%
300% modulus: 1200–1800 p.s.i.

The uncured PTHF homopolymers crystallize quite strongly on standing at room temperatures to form hard, stiff materials which melt in the range of 52°–58° C. to revert to the rubbery state.

The preparation and use of such a normally hard, crystalline polymerized cyclic ether (PTHF) as an impact improver in, respectively, rigid polyvinyl chloride and after-chlorinated polyvinyl chlorides, are disclosed and claimed in the copending applications of P. M. and M. P. Dreyfuss, U.S. Ser. Nos. 694,793 (Joint) and 694,862 (sole P. M. Dreyfuss) both filed Jan. 2, 1968.

The trialkyl oxonium salts of the $HMF_6$ acids such as $HPF_6$, $HAsF_6$ and $HSbF_6$ are powerful alkylating agents and would find many uses in chemical synthesis if the cost of such salts could be reduced to more modest levels.

SUMMARY OF THE INVENTION

In accordance with the present invention. I have found that the above described high cost and other disadvantages of the prior processes for the production of trialkyl oxonium salts are overcome by my new method which comprises mixing a solution of an acid of the structure $HMF_6$ wherein M is a Group V element selected from the class consisting of phosphorous, arsenic or antimony with (1) an epoxide selected from the class consisting of the alkylene oxides and the halogen-substituted alkylene oxides and (2) a dialkyl ether at low temperatures. The desired trialkyl oxonium salt, in which the alkyl groups corresponding in their number of carbon atoms with the alkyl groups of the ether employed, are obtained as a solid, crude crystalline precipitate in good yield. The oxonium salt thus obtained in stable in the resulting water-containing reaction medium, a most surprising result since the literature indicates that such oxonium salts to be unstable toward water. The crude products thus obtained can be purified quite easily by washing with non-solvents and/or recrystallizing them by means of solvent/non-solvent recrystallization techniques. Such method produces the oxonium salts much less expensively and in better yields than known methods and, in addition, produces a very pure product in crystalline form.

The three essential ingredients, namely the $HMF_6$ acid, the epoxide and the ether theoretically combine in the proportions of one mole of the epoxide and 2 moles of the ether for every one mole of the $HMF_6$ acid. For best results in the process of this invention, the ether and epoxide ingredients should be employed in at least a slight excess of theory to ensure highest yields. Since the ethers are extremely good solvents for all ingredients (but not for the oxonium salt) and especially for the $HMF_6$ acid (forms a complex), it is preferred to employ a considerable excess of the ether i.e. at least 4 to 10 moles for every one mole $HMF_6$).

The process of this invention may be applied to the synthesis of any trialkyl oxonium salt of an $HMF_6$ acid, as defined above. Such acids are much more readily and inexpensively obtained or prepared as solutions when there is no necessity to rigorously exclude moisture. Aqueous solutions of $HPF_6$, in particular, containing from 60% to 100%/wt. of acid are commercially-available and may be employed in the process of this invention. Such aqueous solutions need not be of high quality for use in such processes since, as will be shown, even solutions of $HPF_6$ badly discolored and perhaps containing decomposition products (i.e. phosphoric acids) may be employed with little loss in efficiency. It has been noted that the process of this invention appears to proceed to somewhat higher yields if the $HMF_6$ acid reagent contains a slight excess of hydrofluoric acid.

The ether employed in the process of this invention determines the alkyl groups present in the oxonium salt and one will select the ether for this purpose. Thus, there may be employed any of the dialkyl ethers including such ethers where the alkyl groups are alike and those where they are dissimilar including dimethyl ether, methyl ethyl ether, diethyl ether, dipropyl ether, ethyl propyl ether, di-n-butyl ether, di-n-amyl ether, dihexyl ether, di-2-ethylhexyl ether, and many others. Of course, the use of dialkyl ethers with dissimilar alkyl groups will produce an oxonium salt product in which the alkyl groups also are dissimilar. Cyclic ethers such as tetrahydrofuran (THF) may be employed as an ether ingredient in the process of this invention but only to the extent of up to about two-thirds, on a molar basis, of the total ether content of the reaction mixture.

Due to the very low boiling point, extreme flammability and explosive character of dimethyl ether it is preferred to employ the dialkyl ethers in which at least one and preferably both of the alkyl groups contains at least two carbon atoms. Most preferred because of their moderate boiling points, ready-availability and ready reactivity are the dialkyl ethers such as those above in which each alkyl group contains from 2 to 5 carbon atoms.

The third ingredient in the reaction mixture of the process of this invention is an epoxide selected from the class consisting of the alkylene oxides and halogen-substituted alkylene oxides. This ingredient is apparently a good solvent for the reacting ingredients but a poor one for the oxonium salt product. The epoxide is believed to be consumed in the reaction possibly forming an intermediate compound or complex which reacts further forming the desired oxonium salt and several ether-type by-products which have been noted and identified in the reaction mixtures.

Epoxides useful in the method of this invention are the alkylene oxides and halogen-substituted alkylene oxides including ethylene oxide, propylene oxide, the cis- and trans 2,3-epoxybutanes, cyclohexane epoxide, octene-1 epoxide, cyclododecane epoxide, 3,4-epoxyvinylcyclohexane, 1,2-epoxy-5, 6-trans-9, 10-cis-cyclododecadiene, epichlorohydrin, epibromohydrin, trifluoromethyl ethylene oxide, perfluoroethylene oxide, 3,3-bis (chloromethyl) oxetane, and many others. More preferred are the lower alkylene oxides and halogen-substituted lower alkylene oxides in which the alkylene group contains from 2 to 4 carbon atoms. Particularly preferred are epichlorohydrin.

PREPARATION OF OXONIUM SALT

The reaction between the solution of the hexafluoro $HMF_6$ acid and the ether and epoxide ingredients is carried out at temperatures between about $-25°$ C. to about $+35°$ C. Most preferred are temperatures from about $0°$ to about $10°$ C. such as are easily obtained by cooling with ice water.

The reaction should be carried out while carefully controlling the temperature within the range stated. It is necessary, therefore, to intermix the acid or solution thereof with the ether and epoxide at rates consistent with the heat removal capability of the equipment utilized. The interaction sometimes occurs with the formation of a heterogenous reaction mixture which is allowed to stand will in some cases separate out into several distinct layers, one of which can be of a viscous, oily consistency ("coacervate"), and in other cases with the direct separation of the oxonium salt as a white solid. The oily layers on standing for a while usually begin to show a solid precipitate which is the crude oxonium salt. Decanting off the non-oily layers and washing with ether will usually cause the dense, oily-appearing layer to be converted to a solid precipitate. The oily state is believed to be an association product between the oxonium salts and/or side reaction products and the solvent/ether portion of the mixture. To purify the crude oily layer and the crude solid precipitates, washing with an ether removes the associated solvent and impurities leading to the separation of the oxonium salt as a white, crystalline precipitate. Crude precipitates may be dissolved in a solvent such as dichloromethane, the solution dried, and the oxonium salt reprecipitated by addition of, or addition to, a dry non-solvent such as an ether or a hydrocarbon such as hexane. The solid, white, crystalline products obtained in this fashion are filtered off and dried in an inert atmosphere such as a nitrogen or in a vacuum. Triethyl oxonium hexafluorophosphate $[(CH_3-CH_2-)_3{}^+OPF_6{}^-]$ prepared in this fashion exhibits a melting point 144–145° C., a value somewhat higher than literature values for this salt. Nuclear magnetic resonance spectra of this product correspond to that of known samples of the same salt. These data indicate that products of the process of this invention may be somewhat more pure than corresponding products reported in the literature where triethyl oxonium hexafluorophosphate is reported to melt at 137° to 137.5° C.

In working up the reaction mixtures to recover the desired product there are at least two problems to overcome. One is the pronounced tendency of these oxonium salts to associate, complex or otherwise tie themselves to the organic constituents of the mixture. This tendency leads to the formation of oily, viscous layers instead of solid precipitates. Such organic constituents are difficult to remove by evaporation or distillation without decomposing the salt. Also, the crude, low quality aqueous solutions of the $HMF_6$ acids often are highly colored and this discolorization is difficult to remove from the product. The organic materials associated with the salt are best and most efficiently removed by washing or extracting the solvent content of the oily layer and/or sticky solid precipitates with a solvent material which is a non-solvent for the salt but which is quite miscible with the associate organic materials. The colored bodies and impurities appear to be completely removed by dissolving the salt in a good solvent for the oxonium salt and then treating the resulting solution with a solid, insoluble absorbent such as activated carbon. After filtering off the solid absorbent water-white, clear solutions are obtained from which the product may be crystallized and/or precipitated, as by addition of a non-solvent precipitant such as an ether, to obtain the oxonium salt as white, crystalline and granular precipitates of a high state of purity. The latter procedure reduces the number of steps needed in the purification and recovery of the pure product.

The invention will now be described more specifically with reference to several specific examples which are intended as illustrative only and not as limiting the invention.

EXAMPLE I

In this example, triethyl oxonium hexafluorophosphate $(CH_3CH_2)_3O^+PF_6^-$ is produced in good yield and high purity. The following materials are utilized:

Commercial grade Epichlorohydrin ("ECH"): 30 ml.
Diethyl ether (reagent grade, dry): 150 ml.
Commercial grade $HPF_6$ (75%/wt. aq. sol.) 22 grams (16.5 g. $HPF_6$ or 0.113 mole); dark brown color; amount employed contained 5 ml. of water The ether and ECH are combined in 500 ml. flask under an inert nitrogen atmosphere and the flask is immersed in ice water until its liquid contents are at about 0° C. At this point there is begun the addition to the flask of the $HPF_6$ solution in a drop-wise fashion while stirring the liquid in the flask. There is thus added a total of about 22 grams of the 75%/wt. acid solution over a period of about 20 minutes while observing a thermometer immersed in the liquid. Throughout the acid addition steps, the temperature of the liquid mixture is maintained at 5° to 6° C. by control of the rate of the drop-wise addition of acid. The reaction mixture is stirred for sometime after the temperature had again fallen to nearly 0° C. At this point the stirred mixture is clear albeit somewhat brownish in color due to the original dark brown color of the $HPF_6$ solution.

After a total of 20 minutes after completion of the acid addition, the flask is removed from the water/ice bath, at which point the reaction mix is cloudy in appearance, and allowed to warm up to room temperatures. A viscous, "oily" appearing material is then observed to begin to settle out. After still another 15 minutes, the supernatent ether/ECH mixture is removed by decantation and an excess of diethyl ether is added to wash the oily-appearing material. The wash ether is removed and a second portion of ether added, this time with stirring. The oily material is thereby converted to a semi-granular condition. On standing overnight, the liquids decanted from the original reaction mixture showed a further separation of oily material which is separated and separately worked up as described below. Subsequent ether wash liquor show no separation of oil or solids so they are dicarded.

The two portions of semi-granular, sticky-appearing material are separated from the wash ether (still brownish color) and dried under nitrogen after which they are dissolved in methylene chloride. On addition of ether to the resulting solution, there is obtained a whitish, crystalline precipitate. The latter is collected, dried under nitrogen and weighed. The solution/precipitation procedure is again repeated and the now completely granular and crystalline materials are combined, dried under vacuum and stored in a nitrogen-filled, sealed bottle. The total weight of solids thus obtained is 13.76 grams or a yield of 49% based on the original quantity of $HPF_6$ charged. Such dry product melts at 144°–145° C., has a white color, and is of a granular, crystalline appearance. The NMR spectra of products made in this fashion are consistent with those of known samples of this same salt.

In another experiment of this type, the color of the final, crystalline precipitate is much improved and the number of recrystallizations reduced by mixing the methylene chloride solution with a small amount of activated carbon, the mixture warmed gently with stirring for about 15 minutes and the carbon black filtered off. The resulting methylene chloride filtrate is colorless. After two solution/precipitation treatments as described there is obtained a sand-like white precipitate. After drying under vacuum for 3 hours, there is obtained a dry product which melts at 139.5°–140.5°, a value close to that reported for triethyl oxonium hexafluorophosphate in the literature (137–137.5° C.).

EXAMPLE II

In this example, the effect of the water content of the $HPF_6$ solution on yield of product is determined. In some of the experiments a commercially-available 65%/wt. $HPF_6$ solution (65%/wt. $HPF_6$; 6%/wt. HF; 21%/wt. $H_2O$; 8%/wt. of phosphoric acids) is progressively diluted with water before addition to the reaction. In one example, a solid, crystalline hydrate ($HPF_6 \cdot 6H_2$) (57.5%/wt. $HPF_6$) is employed. In other experiments a "100% $HPF_6$" solution is synthesized by adding a slight molar excess of anhydrous hydrofluoric acid (HF) to a solution of $PF_5$ in diethyl ether. The procedure is otherwise similar to that of the foregoing example. The data are as follows:

| Percent/wt. $HPF_6$: | Percent/wt. yield of oxonium salt [1] |
|---|---|
| 75 | 55.5; 49; 46.5 |
| 65 | 39 |
| 60 | 20 |
| 57.5 [2] | 0 |
| 50 | 0 |
| 35 | 0 |
| 55 [3] | 0 |
| 100 [4] | 76 |
| 100 [5] | 100 |

[1] Triethyl oxonium hexafluorophosphate.
[2] Crystalline hydrate $HPF_6 \cdot 6H_2O$.
[3] Contains 70%/wt. anhydrous HF.
[4] Diethyl ether-$PF_5$ solution containing a slight excess of $PF_5$.
[5] Diethyl ether-$PF_5$ solution containing a slight excess of HF over theory for $HPF_6$.

Note that the yield of the desired product has decreased to only 20% at an $HPF_6$ concentration of 60%/wt. and the desired reaction proceeds not at all at a concentration of 57.5%/wt.

EXAMPLE III

In this example, the oxonium salts of $HSbF_6$ are synthesized by a procedure similar to that of the preceding examples. In this case, the desired product is not obtained at any $HSbF_6$ concentration below 100%. In the latter reaction, a solution of $SbF_5$ in diethyl ether is prepared and a quantity of anhydrous HF amounting to a slight excess over theory for $HSbF_6$ added thereto. The resulting solution is not anhydrous for no care to exclude moisture is exercised in its preparation or use. The latter reagent in two successive experiments produces yields of 94% and 90% of the desired triethyl oxonium salt according to the following equation:

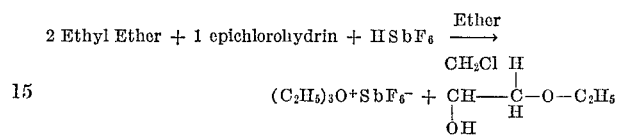

In contrast, the prior art method of Meerwein based on $SbF_5$ proceeds as follows:

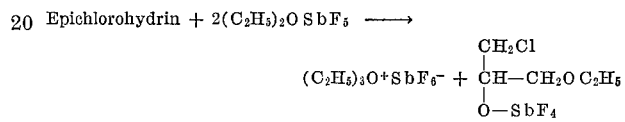

Thus, the reaction of this invention based on $HSbF_6$ provides essentially complete usage of antimony as well as high yields of the desired oxonium salt. Similar results may be obtained employing "100%" $HAsF_6$.

EXAMPLE IV

In one experiment, a 12% yield of triethyl oxonium hexafluorophosphate is obtained by substituting propylene oxide for the epichlorohydrin in the procedure of Example I.

What is claimed is:

1. The process of producing the trialkyl oxonium salts of a hexafluoro acid of the structure $HMF_6$ wherein M is a Group V element selected from phosphorous, arsenic and antimony comprising mixing said acid, an epoxide selected from the class consisting of the alkylene oxides and halogen-substituted alkylene oxides, and a dialkyl ether, and separating the resulting solid trialkyl oxonium salt of said acid from the resulting reaction mixture.

2. The method as defined in claim 1 and further characterized by (1) said acid being $HPF_6$ and is employed in said mixing step in the form of an aqueous solution containing from about 60 to 100%/wt. of $HPF_6$ and (2) said mixing is effected at a temperature in the range of from about −5° to about 15° C.

3. The method as defined in claim 1 wherein the said $HMF_6$ acid is $HAsF_6$.

4. The method as defined in claim 1 wherein the said $HMF_6$ acid is $HSbF_6$.

5. The method of preparing the trialkyl oxonium salts of $HPF_6$ comprising combining an aqueous solution of $HPF_6$ containing from about 60 to 100%/wt. of $HPF_6$ with (1) epichlorohydrin and (2) a dialkyl ether, separating the resulting solid trialkyl oxonium salt of $HPF_6$ and purifying the said solid salt by multiple recrystallization from organic solvent solutions thereof.

6. The method as defined in claim 5 and further characterized by said dialkyl ether being diethyl ether and by there being obtained as a product triethyl oxonium hexafluorophosphate in crystalline form melting at a temperature of from about 140 to about 145° C.

References Cited

UNITED STATES PATENTS 3,513,181   5/1970   Noordermeer et al. _260—606.5X
3,503,898   3/1970   Harris _____ 260—446X TOBIAS E. LEVOW, Primary Examiner W. F. W. BELLAMY, Assistant Examiner U.S. Cl. X.R.

260—606.5, 446